United States Patent
Iellimo

(10) Patent No.: US 7,815,060 B2
(45) Date of Patent: Oct. 19, 2010

(54) CASE FLOW SYSTEM WITH ADJUSTABLE LANE DIVIDERS

(75) Inventor: Domenick Iellimo, Forked River, NJ (US)

(73) Assignee: Frazier Industrial Company, Long Valley, NJ (US)

( * ) Notice: Subject to any disclaimer, the term of this patent is extended or adjusted under 35 U.S.C. 154(b) by 758 days.

(21) Appl. No.: 11/649,626

(22) Filed: Jan. 4, 2007

(65) Prior Publication Data

US 2008/0164116 A1  Jul. 10, 2008

(51) Int. Cl.
*B65G 13/00* (2006.01)
*A47B 57/58* (2006.01)

(52) U.S. Cl. .......................... 211/151; 211/184; 108/61; 193/35 R

(58) Field of Classification Search .................. 211/11, 211/59.2, 59.3, 74, 90.01, 126.15, 151, 153, 211/184; 312/35, 42, 45, 61, 71; 414/276, 414/286; 108/60, 61; 193/35 R; 40/666, 40/658, 661.11

See application file for complete search history.

(56) References Cited

U.S. PATENT DOCUMENTS

| | | | | | |
|---|---|---|---|---|---|
| 423,647 | A | * | 3/1890 | Wells | 211/11 |
| 431,562 | A | * | 7/1890 | Dean | 40/309 |
| 534,799 | A | * | 2/1895 | Koehler | 40/666 |
| 1,439,534 | A | * | 12/1922 | Thompson | 312/42 |
| 1,563,116 | A | * | 11/1925 | Tinsley | 211/151 |
| 2,111,496 | A | * | 3/1938 | Scriba | 211/59.3 |
| 2,257,536 | A | * | 9/1941 | Roycroft | 211/126.1 |
| 2,933,195 | A | * | 4/1960 | Radek | 211/153 |
| 2,950,014 | A | * | 8/1960 | Sullivan | 211/151 |
| 2,964,154 | A | * | 12/1960 | Erickson | 193/35 R |
| 3,083,067 | A | * | 3/1963 | Vos et al. | 312/71 |
| 3,110,402 | A | * | 11/1963 | Mogulescu | 211/59.3 |
| 3,269,558 | A | * | 8/1966 | Hess | 211/184 |
| 3,279,618 | A | * | 10/1966 | Bergstedt | 211/59.2 |
| 3,347,395 | A | * | 10/1967 | Marschak | 211/184 |
| 3,497,081 | A | * | 2/1970 | Field | 211/184 |
| 3,501,016 | A | * | 3/1970 | Eaton | 211/49.1 |
| 3,501,020 | A | * | 3/1970 | Krikorian | 211/184 |
| 3,608,741 | A | * | 9/1971 | Schray | 211/184 |
| 3,669,278 | A | * | 6/1972 | Heroy | 211/184 |
| 3,698,568 | A | * | 10/1972 | Armstrong | 211/184 |
| 3,826,455 | A | * | 7/1974 | O'Donnell | 248/97 |
| 3,900,112 | A | * | 8/1975 | Azzi et al. | 211/187 |
| 4,136,783 | A | * | 1/1979 | Karashima | 211/59.2 |
| 4,168,780 | A | * | 9/1979 | Parrott | 211/151 |
| 4,181,229 | A | * | 1/1980 | Moore | 211/184 |
| 4,190,167 | A | * | 2/1980 | Wells et al. | 211/184 |
| RE30,706 | E | * | 8/1981 | Bustos | 211/59.2 |
| 4,346,806 | A | * | 8/1982 | Bustos | 211/59.4 |
| 4,359,947 | A | * | 11/1982 | Marschak | 108/1 |

(Continued)

*Primary Examiner*—Darnell M Jayne
*Assistant Examiner*—Joshua Rodden
(74) *Attorney, Agent, or Firm*—Dilworth & Barrese, LLP

(57) ABSTRACT

A case flow bed for the handling of merchandise. The case flow bed including (a) a loading end and, opposite thereto, an unloading end; (b) a roller bed positioned between the loading end and unloading end for supporting and permitting sliding movement of merchandise from the loading end to the unloading end; and (c) apertures associated with at least the loading end for removably receiving at least one lane divider in any of a plurality of laterally extending positions for delimiting lanes of travel for the sliding movement of the merchandise.

14 Claims, 6 Drawing Sheets

U.S. PATENT DOCUMENTS

| | | | | |
|---|---|---|---|---|
| 4,383,614 | A * | 5/1983 | Miller | 211/59.2 |
| 4,394,910 | A * | 7/1983 | Miller | 211/59.2 |
| 4,410,093 | A * | 10/1983 | Chiariello et al. | 211/11 |
| 4,461,388 | A * | 7/1984 | Bustos | 211/59.2 |
| 4,519,508 | A * | 5/1985 | Gullett et al. | 211/59.2 |
| 4,625,441 | A * | 12/1986 | Fast | 40/649 |
| 4,677,780 | A * | 7/1987 | Shuman | 40/600 |
| 4,713,899 | A * | 12/1987 | Fast | 40/661.08 |
| 4,729,485 | A * | 3/1988 | Kulbersh | 211/184 |
| 4,765,493 | A * | 8/1988 | Kinney | 211/59.2 |
| 4,981,225 | A * | 1/1991 | Cole | 211/183 |
| D323,440 | S * | 1/1992 | Bustos | D6/574 |
| 5,078,250 | A * | 1/1992 | Cole | 193/35 R |
| 5,115,920 | A * | 5/1992 | Tipton et al. | 211/59.2 |
| 5,119,945 | A * | 6/1992 | Wiggins | 211/59.2 |
| 5,121,681 | A * | 6/1992 | Chang | 108/25 |
| 5,203,464 | A | 4/1993 | Allen | |
| 5,259,518 | A * | 11/1993 | Sorenson et al. | 211/59.2 |
| 5,295,591 | A * | 3/1994 | Slater | 211/59.2 |
| 5,328,038 | A | 7/1994 | Allen | |
| 5,348,169 | A | 9/1994 | Allen | |
| 5,350,048 | A * | 9/1994 | Wylie | 193/35 A |
| 5,464,105 | A * | 11/1995 | Mandeltort | 211/184 |
| D370,576 | S * | 6/1996 | Lechman et al. | D6/476 |
| 5,577,623 | A * | 11/1996 | Bustos | 211/187 |
| 5,657,884 | A * | 8/1997 | Zilincar, III | 211/86.01 |
| 5,678,699 | A * | 10/1997 | Gebka | 211/57.1 |
| 5,683,003 | A * | 11/1997 | Gebka | 211/57.1 |
| 5,779,064 | A * | 7/1998 | Dolling | 211/59.2 |
| 5,803,276 | A * | 9/1998 | Vogler | 211/184 |
| 5,845,794 | A * | 12/1998 | Highsmith | 211/189 |
| 5,887,732 | A * | 3/1999 | Zimmer et al. | 211/59.2 |
| 5,944,237 | A * | 8/1999 | Gouldson | 223/85 |
| 5,951,228 | A * | 9/1999 | Pfeiffer et al. | 414/276 |
| 6,073,743 | A | 6/2000 | Mefford | |
| 6,082,687 | A * | 7/2000 | Kump et al. | 248/220.41 |
| 6,105,798 | A * | 8/2000 | Gruber et al. | 211/151 |
| 6,116,436 | A * | 9/2000 | Ferrucci et al. | 211/187 |
| 6,132,158 | A * | 10/2000 | Pfeiffer et al. | 414/276 |
| 6,161,708 | A * | 12/2000 | Myler | 211/90.02 |
| 6,196,401 | B1 * | 3/2001 | Brady et al. | 211/186 |
| 6,230,908 | B1 * | 5/2001 | Sloan et al. | 211/151 |
| 6,289,618 | B1 * | 9/2001 | Kump et al. | 40/657 |
| 6,364,130 | B2 * | 4/2002 | Wright | 211/41.3 |
| 6,431,808 | B1 * | 8/2002 | Lowrey et al. | 414/276 |
| 6,490,983 | B1 * | 12/2002 | Nicholson et al. | 108/106 |
| 6,520,357 | B1 * | 2/2003 | Kautz et al. | 211/191 |
| 6,675,946 | B2 * | 1/2004 | Lutz | 193/35 TE |
| 6,685,037 | B1 * | 2/2004 | Zadak | 211/184 |
| 6,698,124 | B2 * | 3/2004 | Kump et al. | 40/642.02 |
| RE38,517 | E * | 5/2004 | Pfeiffer et al. | 414/276 |
| 6,823,997 | B2 * | 11/2004 | Linden et al. | 211/59.3 |
| 7,090,064 | B2 * | 8/2006 | Lutz | 193/35 R |
| 7,114,277 | B2 * | 10/2006 | Valiulis et al. | 40/648 |
| 7,119,759 | B2 * | 10/2006 | Zehner et al. | 345/1.1 |
| 7,510,066 | B2 * | 3/2009 | Goffredo et al. | 193/35 A |
| 2002/0179556 | A1 * | 12/2002 | Osawa | 211/184 |
| 2003/0196974 | A1 * | 10/2003 | Cuzzocrea | 211/113 |
| 2004/0099619 | A1 * | 5/2004 | Bustos | 211/59.2 |
| 2005/0150847 | A1 * | 7/2005 | Hawkinson | 211/59.2 |
| 2006/0037832 | A1 * | 2/2006 | Lawless et al. | 193/35 R |
| 2008/0145197 | A1 * | 6/2008 | Taylor et al. | 414/276 |

* cited by examiner

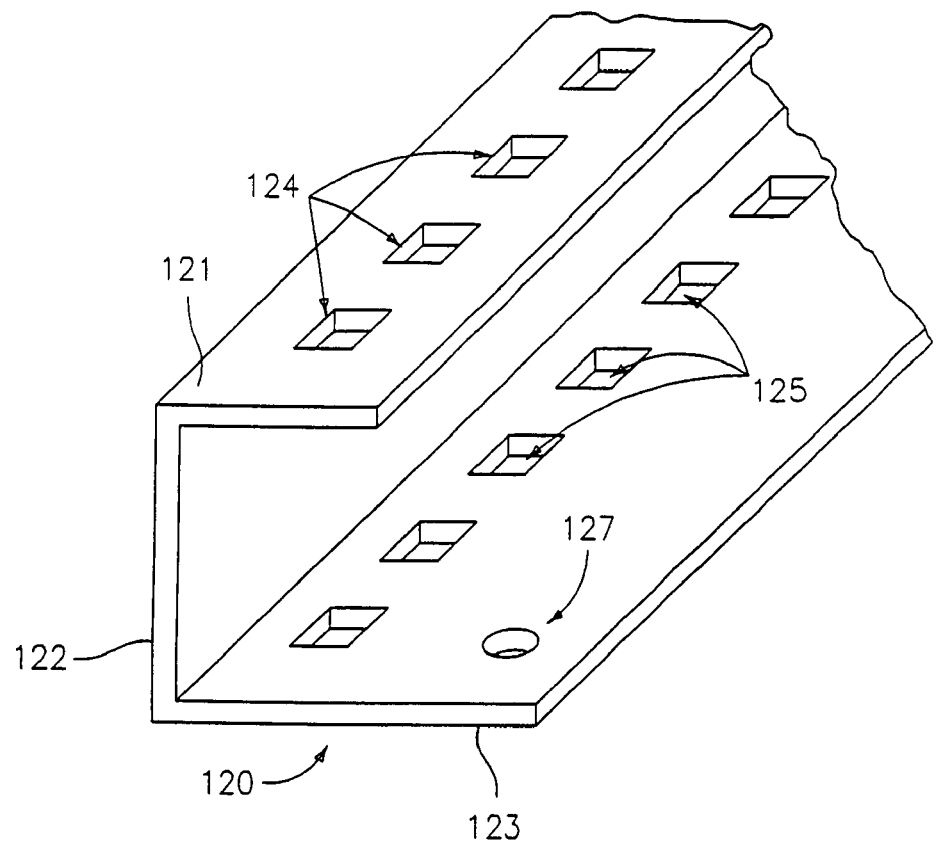
FIG. 5
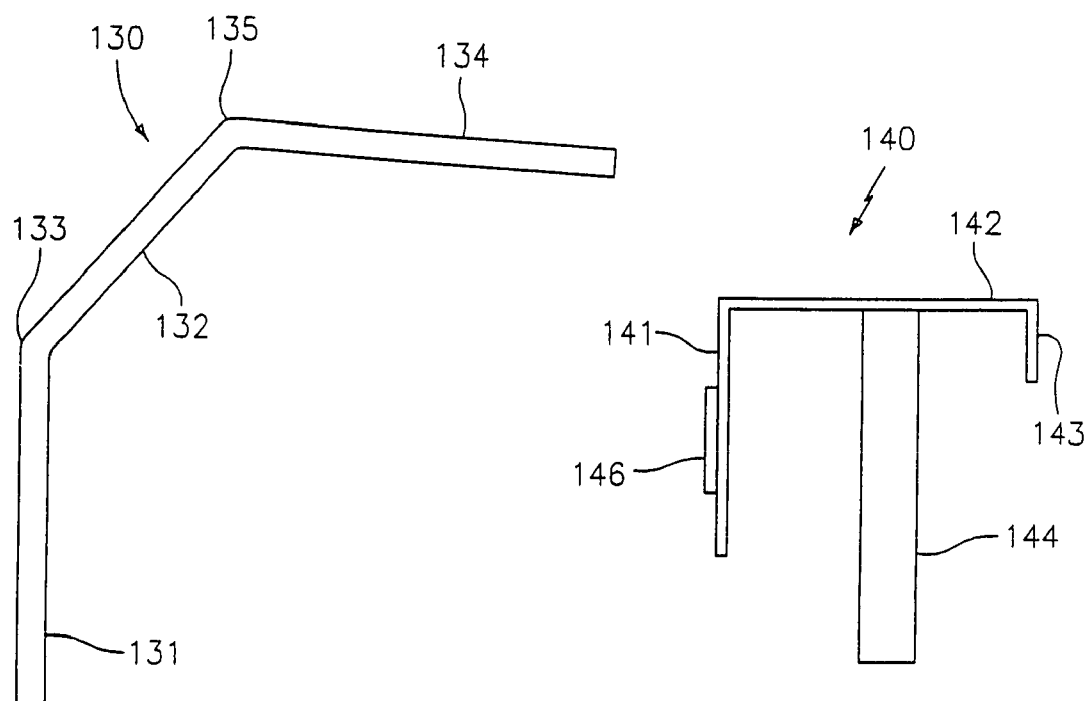
FIG. 6
FIG. 7

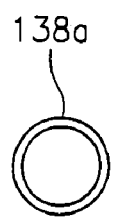
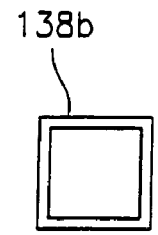
FIG. 10A  FIG. 10B
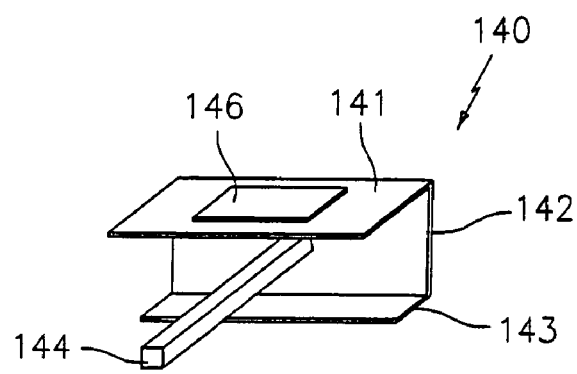
FIG. 11
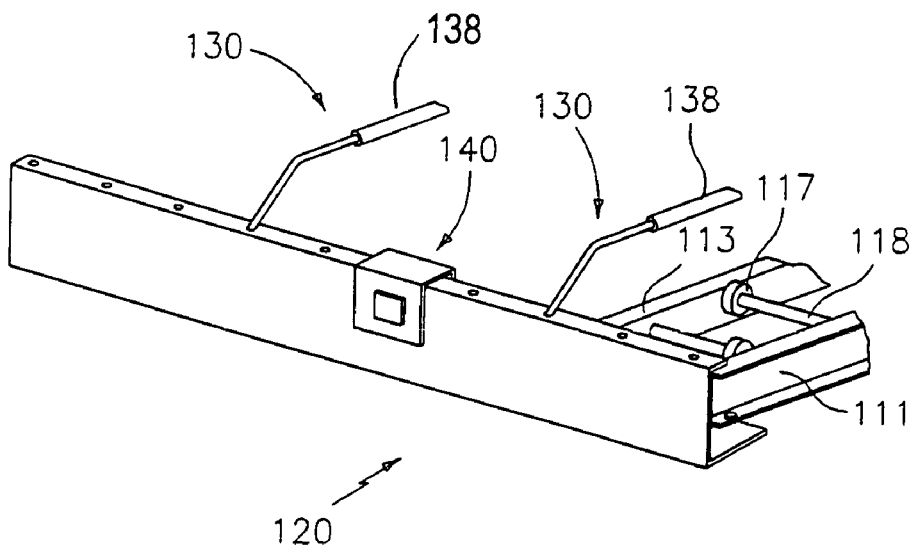
FIG. 12

CASE FLOW SYSTEM WITH ADJUSTABLE LANE DIVIDERS

BACKGROUND

1. Field of the Invention

The present application relates to a case flow system which is especially useful for managing inventory in a warehouse.

2. Background of the Art

Case flow systems are typically employed by distributors in warehouses or other facilities for managing the inflow and outflow of cases of merchandise, or inventory, from manufacturers to retailers or other receivers. The distributors temporarily store the variety of goods received from the manufacturer, and ship selected goods to the retailers in accordance with demand as determined by the consumer purchases.

Case flow structures are typically equipped with a roller bed including a plurality of wheels mounted to steel axles joined to a pair of side rails. Case flow roller beds are typically inclined. Thus, the cases, cartons, totes or any other type of container of merchandise are loaded onto the loading end of the roller bed and are allowed to "flow" towards the unloading end under the force of gravity. The cases are manually retrieved from the unloading end of the case flow roller bed.

U.S. Pat. No. 6,073,743 to Mefford discloses a case flow system comprising a roller bed equipped with a plurality of independent wheels disposed in a spaced apart relationship along a set of steel axles joined to a pair of side rails. A plurality of inverted generally U-shaped support members extend from the rear to the front of each bed and are located adjacent the wheels. The support members rest upon, and transfer the load to, cross beams disposed underneath the support members, which reduces the load on the axles.

A problem associated with case flow bed systems is the precise lateral placement of the merchandise so that it can be picked up at the proper location along the unloading end. For example, merchandise can be placed imprecisely at the loading end, or can shift laterally while moving to the unloading end, thereby causing shipping errors because of mistaken carton retrieval at the unloading end of the case flow system. At best such errors are time consuming inconveniences. It can be readily appreciated, though, that the risk associated with mishandling of certain types of merchandise, such as pharmaceutical items, necessitates more careful sorting and handling.

SUMMARY

A case flow bed is provided herein for the handling of merchandise. The case flow bed comprises (a) a loading end and, opposite thereto, an unloading end; (b) transfer means positioned between said loading end and unloading end for supporting and permitting sliding movement of articles from the loading end to the unloading end; and (c) lane adjustment means associated with at least said loading end for removably receiving at least one lane divider in any of a plurality of laterally extending positions for delimiting lanes of travel for the sliding movement of the articles.

In one embodiment of the invention the lane adjustment means comprises a laterally extending first row of a plurality of non-circular apertures in at least the top portion of an end frame, the aperatures for removably and non-rotatingly engaging one or more lane dividers at the portion with the non-circular cross-section.

In another embodiment of the invention the lane adjustment means further comprises a laterally extending second row of a plurality of non-circular apertures in the bottom portion of the end frame, each of said apertures in said second row being vertically aligned with a corresponding aperture in the first row.

In another embodiment of the invention the lane adjustment means further comprises at least two lane dividers, each lane divider comprising a single piece member having a vertical first end portion, an angled middle portion connected to the vertical first end portion at a first bend, and a horizontal second end portion connected to the angled middle portion at a second bend, said lane dividers being configured and dimensional such that the vertical first end portion can be removably and non-rotatingly disposed through any of the apertures in the first row of apertures and the corresponding aperture in the second row of apertures.

The case flow bed of the invention advantageously provides erasily adjustable marked lanes for managing the sorting and transfer of cartons while reducing the possibility of mishandling caused by undesirable lateral shifting of the cartons.

BRIEF DESCRIPTION OF THE DRAWINGS

Various embodiments are described below with reference to the drawings wherein:

FIG. 5 is a partially cut-away view of an end frame;

FIG. 6 is a view illustrating a lane divider;

FIG. 7 is a side elevational view of a label holder;

FIGS. 10A and 10B illustrate alternative embodiments of the guide rail;

FIG. 11 is a perspective view of the label holder;

FIG. 12 illustrates the placement off the label holder on the end frame.

DETAILED DESCRIPTION OF PREFERRED EMBODIMENT(S)

Figure 1:
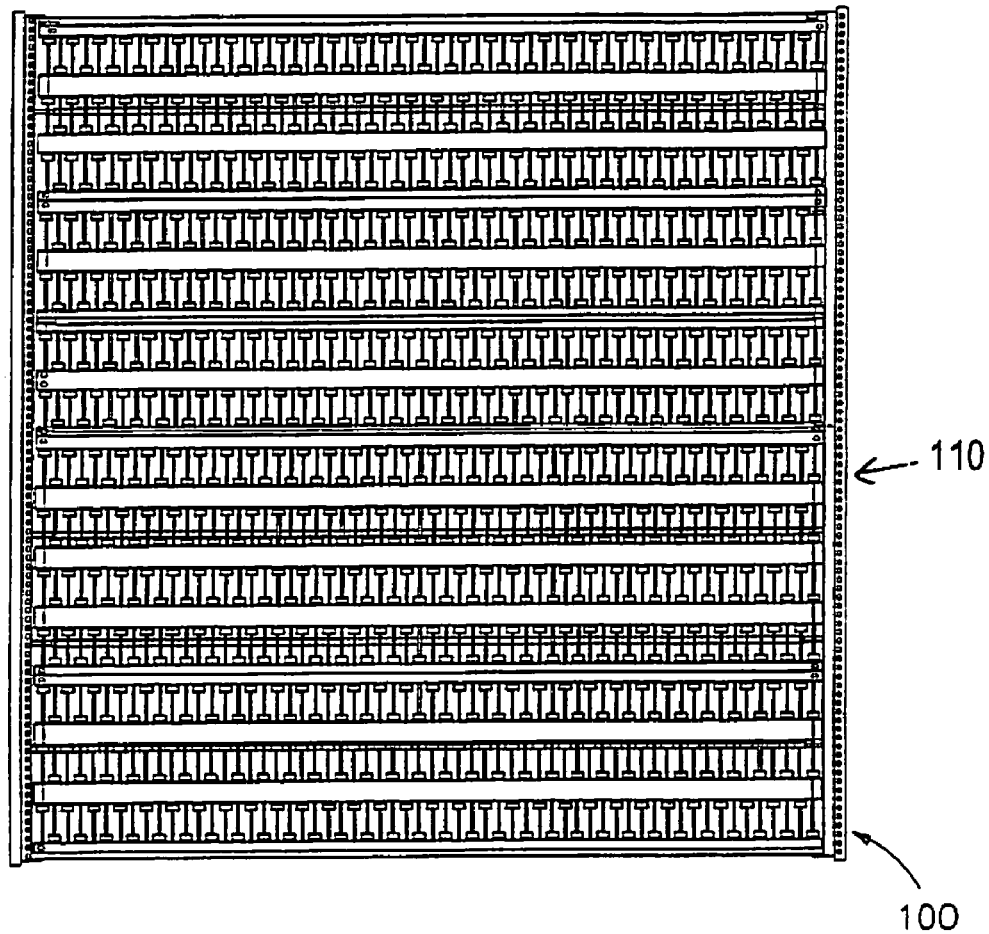
FIG. 1 is a plan view of a case flow bed.

The terms "merchandise" and "inventory" are used interchangeably in the present application. Also, the terms "cases" and "cartons" are used interchangeably. Like numerals in the drawing denote like features of the invention.

The flow system described herein facilitates the management of inventory in warehouses or any other facilities in which articles are sorted and transferred. Typically, the inventory is in containers and temporarily stored on pallets to provide pallet-supported inventory units which are transportable by, for example, forklift trucks or other movers. The case flow bed of the invention is typically used in warehouses to sort articles such as cartons, totes, packages and other containers of merchandise for delivery. The incoming containers are placed at designated positions at one end of the case flow bed, which is angled sightly downward. The containers then roll by gravity to the other end of the bed where they are picked up for delivery to the retailer (or other recipient). While the case flow bed described herein advantageously uses rollers 117 to facilitate the downward sliding flow of the merchandise, any other means of transferring merchandise can be used such as non-stick sliding surfaces, or means of levitating the merchandise to reduce friction such as compressed air jets blown through openings in the sliding surface. The invention includes lane dividers which can be placed at various positions along the case bed so that the packages can be sorted by size. The lane dividers include at least one angled piece which fits into apertures in the end frame of the case flow bed. Optionally, the lane dividers can include a second angled piece and a tubular guide member so that the line divider extends completely along the length of the case flow bed.

A second feature of the invention is a label holder which can be fitted into one of the apertures of the end frame to mark the lane with, e.g., a bar code or other identifier. The label holder and lane dividers can, of course, be adjusted as necessary.

Figure 2:
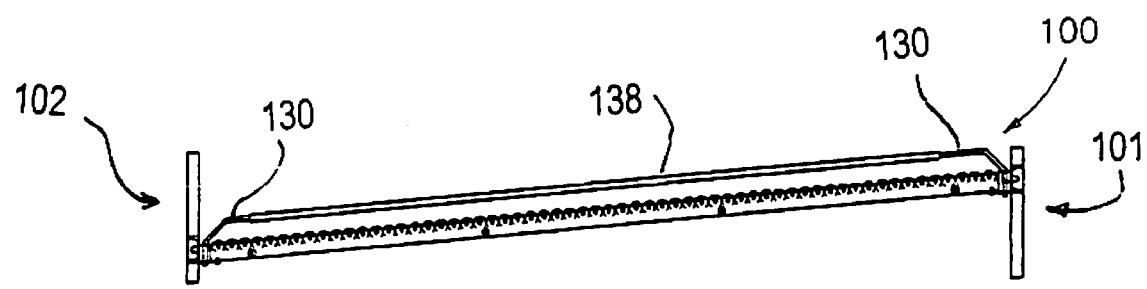
FIG. 2 is a side elevational view of the case flow bed.
Figure 3:
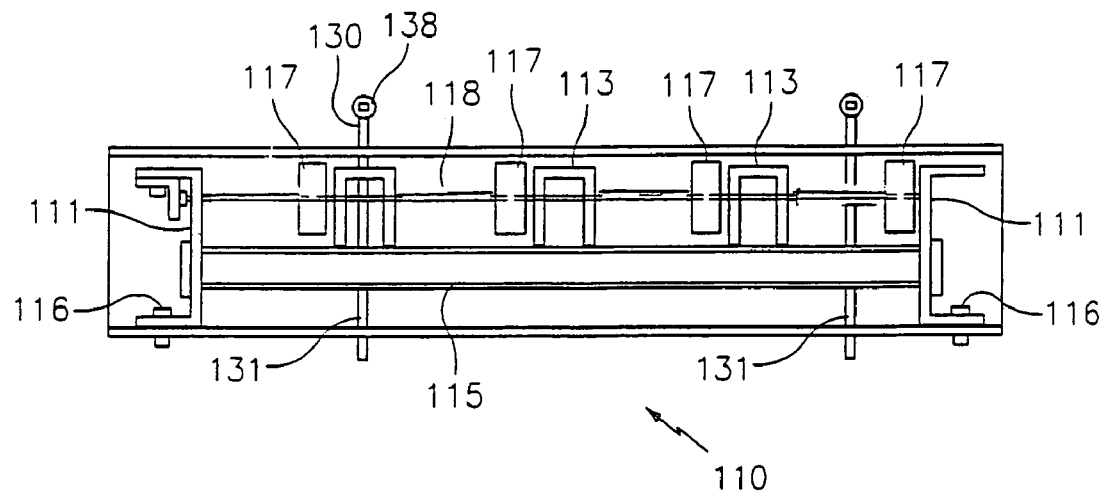
FIG. 3 is an end view of a section of the case flow bed section.

More particularly now referring to FIGS. 1, 2 and 3 of the drawings, the case flow bed 100 includes one or more bed sections 110 arranged side by side. The case flow bed 100 is inclined at an angle to permit the cartons placed at the loading end 101 to roll down under the force of gravity to the unloading end 102 for pickup. The pitch of the inclined bed is typically about one inch drop in height per foot of length.

Figure 4:
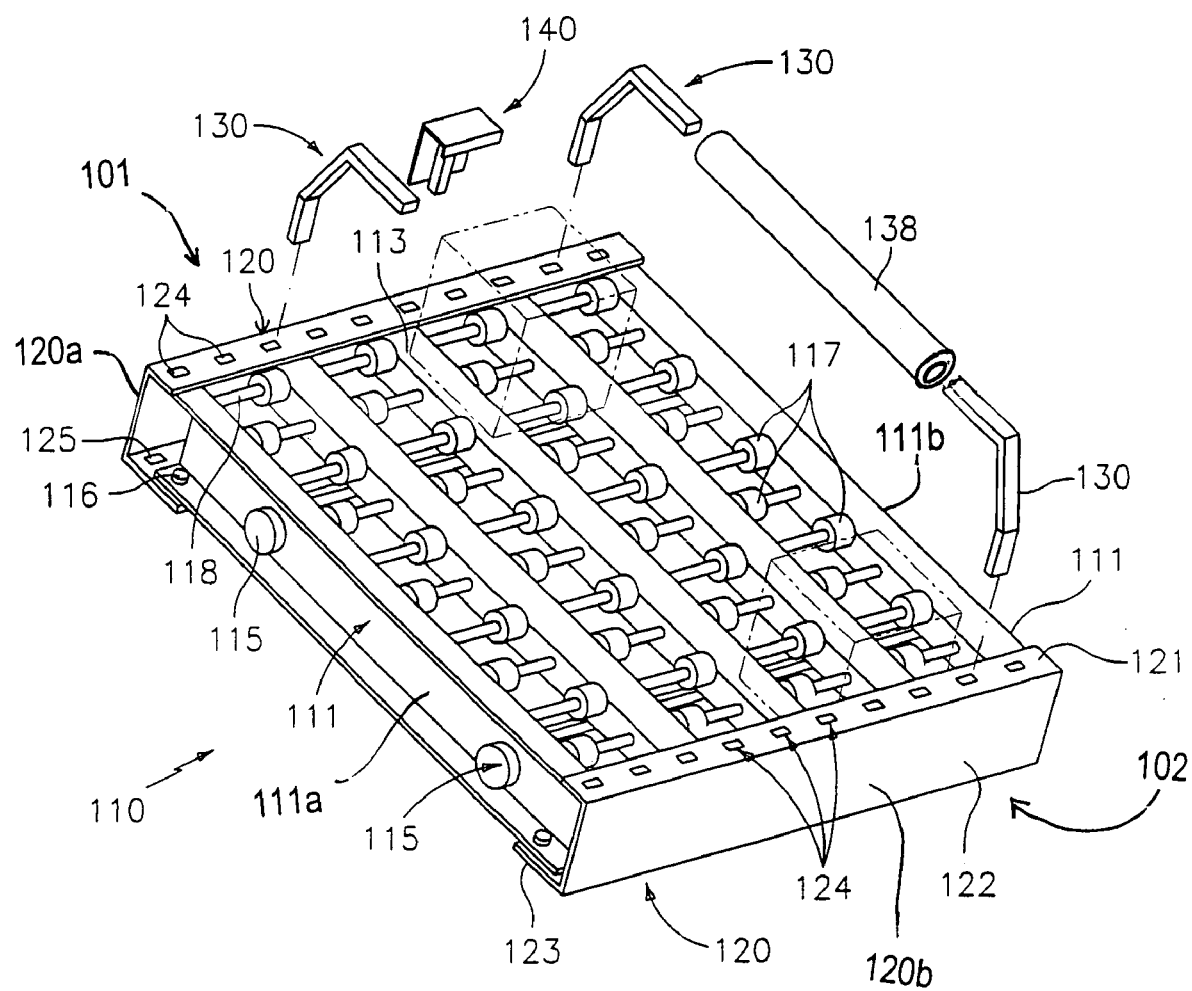
FIG. 4 is an exploded perspective view illustrating a case flow bed section.

Referring now to FIGS. 3 and 4, a case flow bed section 110 includes two side beams 111, and two end frames 120, one end frame 120a at the higher, loading end 101 of the case flow bed and the other end frame 120b at the lower, unloading end 102 of the case flow bed. Case flow bed section 110 includes a plurality of rollers 117 rotatably supported on laterally extending axles 118. Support members 113 extend lengthwise along the case flow bed section 110 and provide support for axles 118. Cross beams 115 extend laterally from one side beam 111a to the opposite side beam 111b for lateral support.

Figure 8:
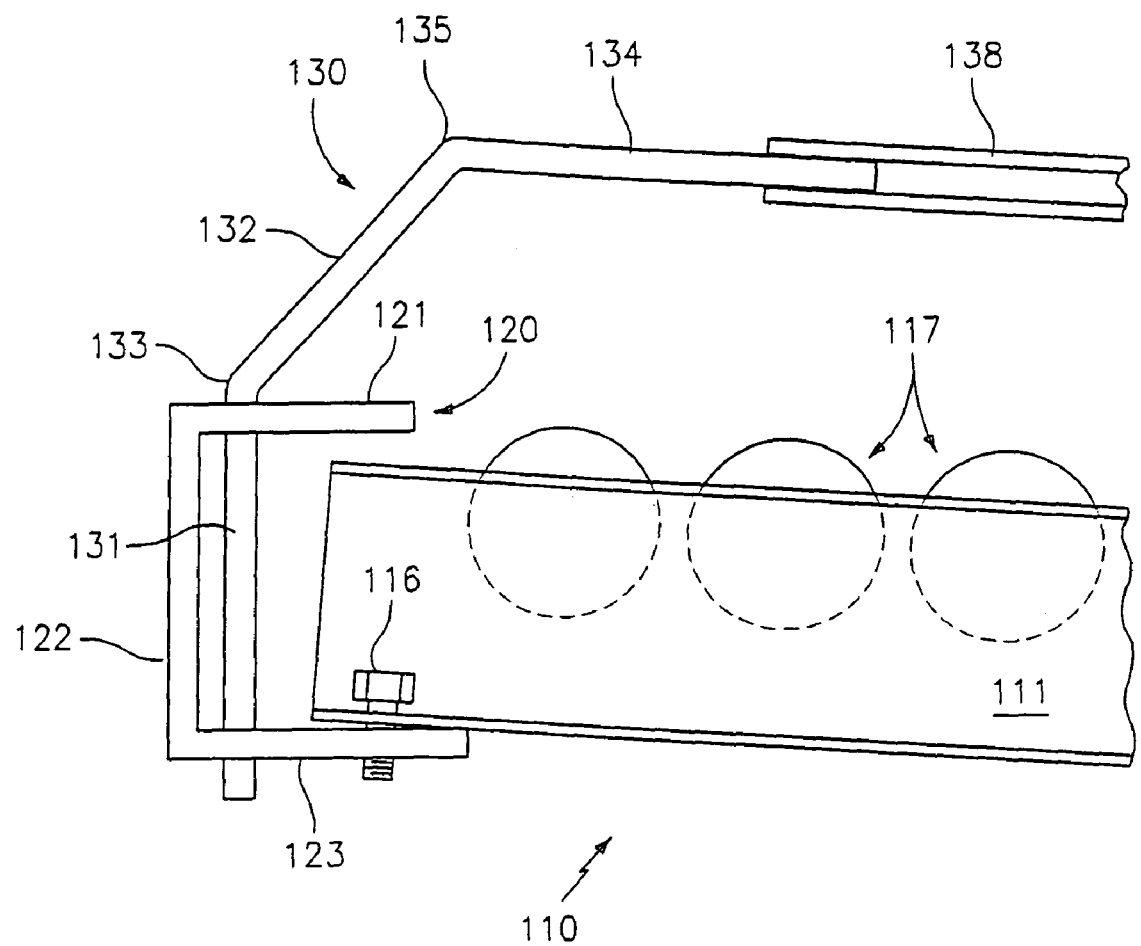
FIG. 8 is a side elevational view illustrating an end portion of the case flow bed.
Figure 9A:
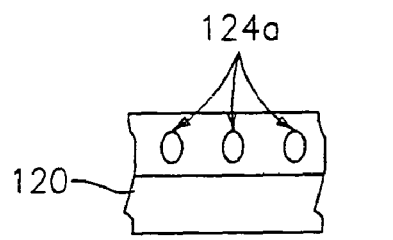
FIGS. 9A, 9B and 9C illustrate alternative embodiments of the apertures in the end frame.
Figure 9B:
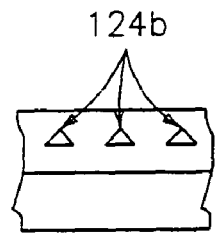
Figure 9C:
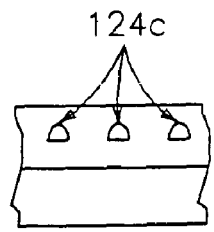

Referring now also to FIGS. 4, 5, and 8, end frames 120 each include a top portion 121, a side portion 122 and a bottom portion 123. The end frames 120 each further include a plurality of apertures 124 in the top portion 121 and a plurality of apertures 125 in the bottom portion 123, each aperture 125 being vertically aligned with a respective aperture 124. Apertures 124 and 125 are positioned in respective laterally extending rows. Apertures 124 and 125 are adapted to receive a vertical portion 131 of the lane divider 130 as explained more fully below. The apertures 124 and 125 are shaped so as to prevent rotational movement of the lane divider 130 when engaged in the apertures. Any non circular shape is suitable. While a square or quadrangular shape as shown in FIG. 5 is preferable, non circular shapes such as oblong 124a, triangular 124b or hemispherical 124c as shown in FIGS. 9A, 9B and 9C, respectively, are alternatively suitable.

The apertures 124 and 125 are preferably of consistent shape and dimension so that the lane divider 130 can be inserted into any of the apertures along the row for adjusting the width of the lane. The end frame 120 preferably further includes at least one aperture 127 on each end to receive a bolt 116 for fastening to the side beam 111.

Referring also now to FIGS. 6 and 7, The case flow bed 100 includes one or more lane dividers 130. Each lane divider comprises a shaped single piece metal rod having a cross section adapted for reception into an aperture 124 and an aperture 125. As shown herein lane divider 130 has a square cross section, but oblong, triangular or hemispherical cross sections, as well as any other non-circular cross section, are suitable for use in the invention. The lane divider 130 preferably includes a vertical portion 131, a middle angled portion 132, and a horizontal portion 134. Vertical portion 131 and angled portion 132 meet at corner 133. Angled portion 132 and horizontal portion 134 meet at corner 135. Corner 133 limits the insertion of the lane divider 130 into corresponding aligned apertures 124 and 125. The angled portion 132 is of a dimension suitable to position horizontal portion 134 at a predetermined desired height above the bed.

Referring now to FIG. 4, cartons have a tendency to travel straight down the bed without much lateral shifting. Therefore, in one embodiment only lane divider 130 positioned at the loading end 101 of the case flow bed 100 is required. However, when it is necessary to provide a higher degree of secure handling, lane dividers 130 can also be positioned at the unloading end 102 of the case flow bed and connected by respective tubular guide rails 138 with corresponding lane dividers at the loading end 101 of the case flow bed 100. The guide rails 138 prevent any lateral shifting of cartons from one designated lane to another lane. The horizontal portions 134 of the respective lane dividers at the loading end and unloading end are each inserted into the central bore of the tubular guide rail 138 at the respective opposite ends thereof.

Referring to FIGS. 10A and 10B, the tubular guide rail 138 can have a circular cross section (FIG. 10A), a square or other quadrangular cross section (FIG. 10B), or any other cross section suitable for receiving the lane divider 130.

The lane dividers 130 are laterally spaced apart from each other to accommodate cartons of a certain width. The position of a lane divider 130 can be readily changed by removing it from one aperture and placing it in another aperture. Accordingly, the case flow bed 100 provides easily adjustable lane widths to accommodate different sized cartons.

Referring to FIGS. 7, 11 and 12, another feature of the invention includes the removable label holder 140. Label holder 140 includes a front vertical side 141, a top horizontal side 142 and a rear vertical side 143. Preferably front side 141 is vertically longer than rear vertical side 143. Post 144 extends downward from the top side 143 and is configured and dimensioned to fit into any of the apertures 124 in the top portion of the end frame 120. A label 146 can be temporarily or permanently affixed to the front side 141 and can include any suitable indicia to identify a lane for merchandise transfer, such as bar coding, alphanumerics, etc. In a preferred embodiment the label 146 includes machine readable indicia to facilitate automation of the warehousing process.

Figure 13:
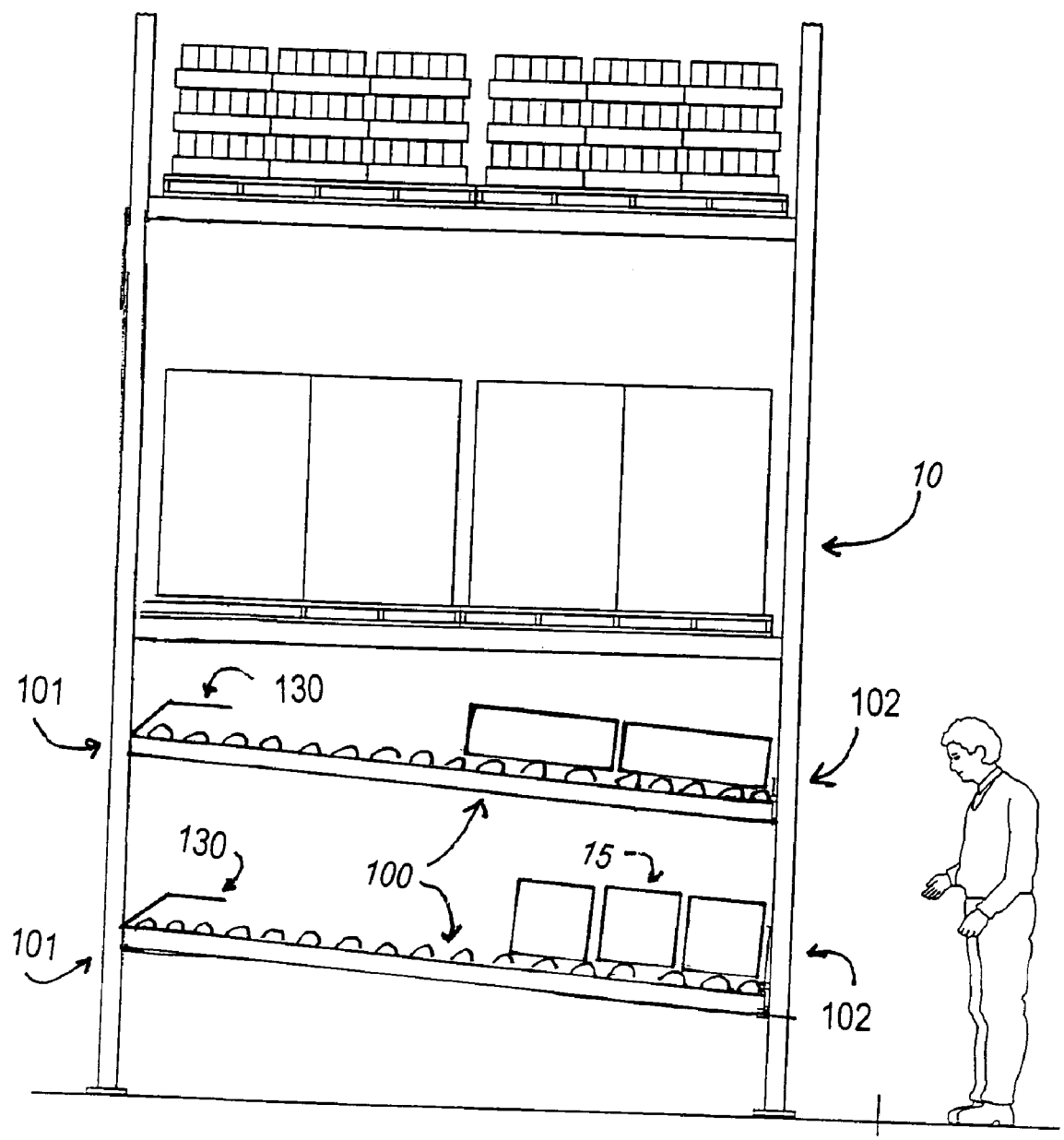
FIG. 13 illustrates a stacked arrangement of case flow beds in a master frame.

More than one case flow bed can be mounted in a stacked vertical relationship in a master frame 10, as shown in FIG. 13. The system of the invention operates as follows. The lane dividers 130 are positioned in selected apertures 124, 125 to define lanes of predetermined widths according to, for example, the size and/or quantity of the cartons 15 to be transferred to the lanes, and the lanes are marked with the appropriate identifying indicia by positioning the label holders at the loading and unloading ends of the case flow bed 100. The labels can be automatically read by optical readers (e.g., bar code readers) to identify the appropriate preselected lanes for corresponding merchandise. The merchandise can then be sorted and loaded into the appropriate lanes of the case flow bed 100 at loading end 101, whereupon the merchandise rolls down to the unloading end 102 for subsequent pickup and transfer, for example, for shipment to retailers or consumers.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A case flow bed having a longitudinal extension and a lateral extension, comprising:
   a) a loading end and, longitudinally opposite thereto, an unloading end,
   b) a plurality of inclined bed sections, each bed section including a plurality of rollers, said bed sections being positioned between said loading end and unloading end for supporting and permitting longitudinal sliding movement of articles from the loading end to the unloading end;
   c) lane adjustment means associated with at least said loading end for removably receiving at least one lane divider in any of a plurality of laterally spaced positions for delimiting lanes of travel for the sliding movement of the articles, said at least one lane divider having at least a portion with a non-circular cross-section
   wherein each of said loading end and unloading end comprises a laterally extending end frame having a top portion and a bottom portion and said lane adjustment means comprises a laterally extending first row of a plurality of non-circular apertures in at least the top portion of the end frame, said apertures for removably and non-rotatingly engaging one or more lane dividers at the portion with the non-circular cross-section,
   wherein the lane adjustment means further comprises a laterally extending second row of a plurality of non-circular apertures in the bottom portion of the end frame, each of said apertures in said second row being vertically aligned with a corresponding aperture in the first row,
   the case flow bed further comprising at least two lane dividers, each lane divider comprising a single piece member having a vertical first end portion, an angled middle portion connected to the vertical first end portion at a first bend, and a horizontal second end portion connected to the angled middle portion at a second bend, wherein the vertical first end portion of each of the lane dividers can be removably and non-rotatingly disposed through any of the apertures in the first row of apertures and the corresponding aperture in the second row of apertures,
   wherein at least a first lane divider is engaged in the end frame of the loading end of the case flow bed and a second lane divider is engaged in the end frame at the unloading end of the case flow bed, wherein the horizontal second end portions of each of said first and second lane dividers are respectively connected to opposite ends of a tubular guide rail extending therebetween.

2. The case flow bed of claim 1 wherein a third lane divider is configured to be engaged in the end frame of the loading end of the case flow bed or the unloading end of the case flow bed in a position laterally spaced from said corresponding first or second lane divider.

3. The case flow bed of claim 1 wherein the bed sections each include a plurality of laterally extending axles longitudinally spaced apart from each other, and the plurality of rollers are rotatably mounted to and disposed in a spaced-apart pattern along said axles.

4. The case flow bed of claim 3 wherein the bed sections further include a plurality of support members oriented longitudinally and laterally spaced apart from each other, the axles being disposed through, and at least partially supported by, the support members.

5. The case flow bed of claim 1 wherein the apertures are configured in a shape selected from quadrangular, triangular and hemispherical.

6. The case flow bed of claim 1 further comprising a label holder having a post removably received in any of the apertures in the first row of apertures, and having a surface for mounting a label.

7. The case flow bed of claim 6 wherein the label includes machine readable indicia.

8. The case flow bed of claim 7 wherein the machine readable indicia comprises a bar code.

9. A case flow system comprising at least one inclined case flow bed mounted to a support frame, said case flow bed having a longitudinal extension and a lateral extension and further comprising:
   a) a loading end and, longitudinally opposite thereto, an unloading end,
   b) a plurality of inclined bed sections, each bed section including a plurality of rollers, said bed sections being positioned between said loading end and unloading end for supporting and permitting sliding movement of articles from the loading end to the unloading end;
   c) lane adjustment means associated with at least said loading end for removably receiving at least one lane divider having at least a portion with a non-circular cross section in any of a plurality of laterally spaced positions for delimiting lanes of travel for the sliding movement of the articles
   wherein each of said loading end and unloading end comprises a laterally extending end frame having a top portion and a bottom portion and said lane adjustment means comprises a laterally extending first row of a plurality of non-circular apertures in at least the top portion of the end frame, said aperatures for removably and non-rotatingly engaging one or more lane dividers at the portion with the non-circular cross-section
   wherein the lane adjustment means further comprises a laterally extending second row of a plurality of non-circular apertures in the bottom portion of the end frame, each of said apertures in said second row being vertically aligned with a corresponding aperture in the first row,
   the case flow bed further comprising at least two lane dividers, each lane divider comprising a single piece member having a vertical first end portion, an angled middle portion connected to the vertical first end portion at a first bend, and a horizontal second end portion connected to the angled middle portion at a second bend, wherein the vertical first end portion of each of the lane dividers can be removably and non-rotatingly disposed through any of the apertures in the first row of apertures and the corresponding aperture in the second row of apertures,
   wherein at least a first lane divider is engaged in the end frame of the loading end of the case flow bed and a second lane divider is engaged in the end frame at the unloading end of the case flow bed, wherein the horizontal second end portions of each of said first and second lane dividers are respectively connected to opposite ends of a tubular guide rail extending therebetween; and
   d) at least one label holder removably receivable into any of the laterally extending first row of apertures for identifying the lanes of travel for selected articles.

10. The case flow system of claim 9 comprising at least two case flow beds in stacked spaced apart vertical arrangement.

11. The case flow system of claim 1 wherein at least one of the lane dividers has a uniform non-circular cross section.

12. The case flow system of claim 1 wherein the tubular guide rail has a quadrangular cross-section.

13. The case flow system of claim 1 wherein the inclination of the bed sections is about one inch per foot of length.

14. The case flow system of claim 6 wherein the surface for mounting the label is parallel to the end frame.

* * * * *